(No Model.) 9 Sheets—Sheet 1.

F. EGGE.
MACHINE FOR MAKING LACING STUDS.

No. 462,243. Patented Nov. 3, 1891.

WITNESSES:
J. V. Finch.
R. C. Ambler

INVENTOR
Fredk Egge
BY
F. W. Smith Jr.
ATTORNEY (No Model.) 9 Sheets—Sheet 2.
F. EGGE.
MACHINE FOR MAKING LACING STUDS.

No. 462,243. Patented Nov. 3, 1891.

WITNESSES:
J. S. Finch
R. C. Ambler

INVENTOR
Fredk Egge
BY F. W. Smith Jr.
ATTORNEY (No Model.) 9 Sheets—Sheet 3.

F. EGGE.
MACHINE FOR MAKING LACING STUDS.

No. 462,243. Patented Nov. 3, 1891.

WITNESSES:
J. S. Hinch
R. C. Ambler

INVENTOR
Fred'k Egge
BY F. W. Smith Jr.
ATTORNEY (No Model.)

9 Sheets—Sheet 6.

F. EGGE.
MACHINE FOR MAKING LACING STUDS.

No. 462,243. Patented Nov. 3, 1891.

WITNESSES:
J. S. Finch
R. C. Ambler

INVENTOR
Fred<sup>k</sup> Egge
BY F. W. Smith Jr.
ATTORNEY (No Model.)   9 Sheets—Sheet 7.

F. EGGE.
MACHINE FOR MAKING LACING STUDS.

No. 462,243.   Patented Nov. 3, 1891.

WITNESSES:
J. H. Finch.
R. C. Ambler.

INVENTOR
Fred'k Egge
BY
T. W. Smith Jr.
ATTORNEY

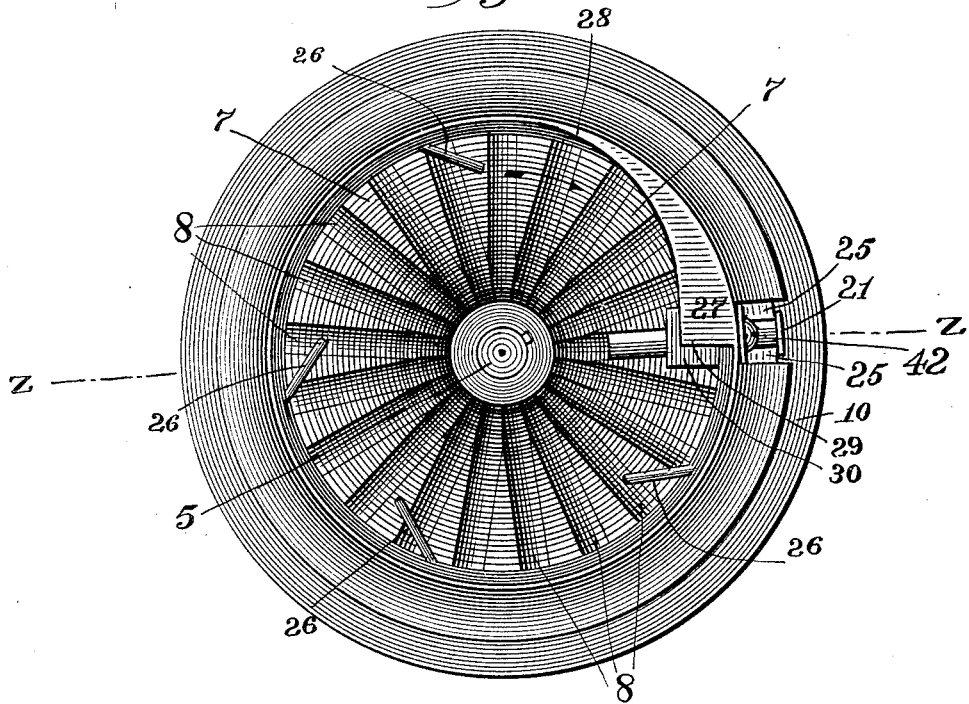
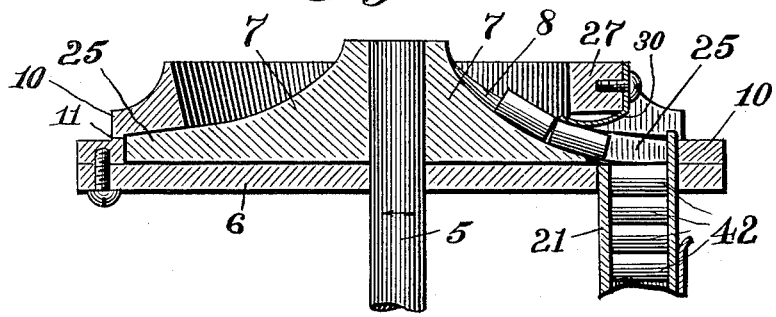

(No Model.) 9 Sheets—Sheet 9.
F. EGGE.
MACHINE FOR MAKING LACING STUDS.
No. 462,243. Patented Nov. 3, 1891.
Fig. 11.
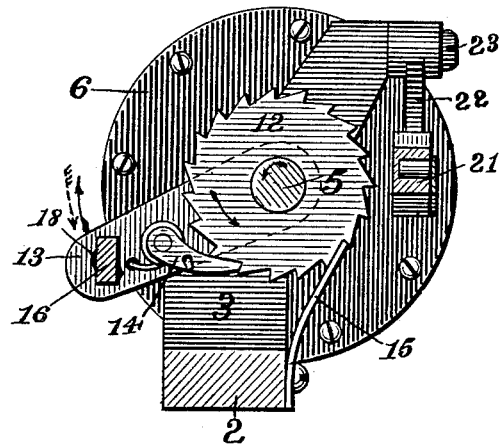
Fig. 12.
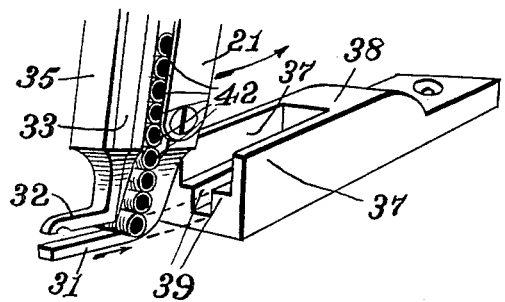
Fig. 13. Fig. 14. Fig. 15.
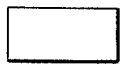 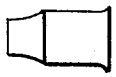 
WITNESSES:
J. F. Finch
R. C. Ambler
INVENTOR
Fredk Egge
BY F. W. Smith Jr.
ATTORNEY

United States Patent Office.

FREDERICK EGGE, OF BRIDGEPORT, CONNECTICUT, ASSIGNOR TO WILLIAM H. SMIDT AND EBERHARD L. PUPKE, OF NEW YORK, N. Y.

MACHINE FOR MAKING LACING-STUDS.

SPECIFICATION forming part of Letters Patent No. 462,243, dated November 3, 1891.

Application filed January 6, 1891. Serial No. 376,898. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Manufacturing Lacing-Studs; and I do hereby declare the following to be a full, clear, and exact description of the invention, such as will enable others skilled in the art to which it appertains to make and use the same.

My invention relates to machines for manufacturing lacing-studs from sheet-metal tubes, and has for its object to rapidly and uniformly produce such tubes; and with these ends in view my invention consists in the details of construction and combination of elements, such as will be hereinafter fully set forth, and then specifically be designated by the claims.

Figure 1:
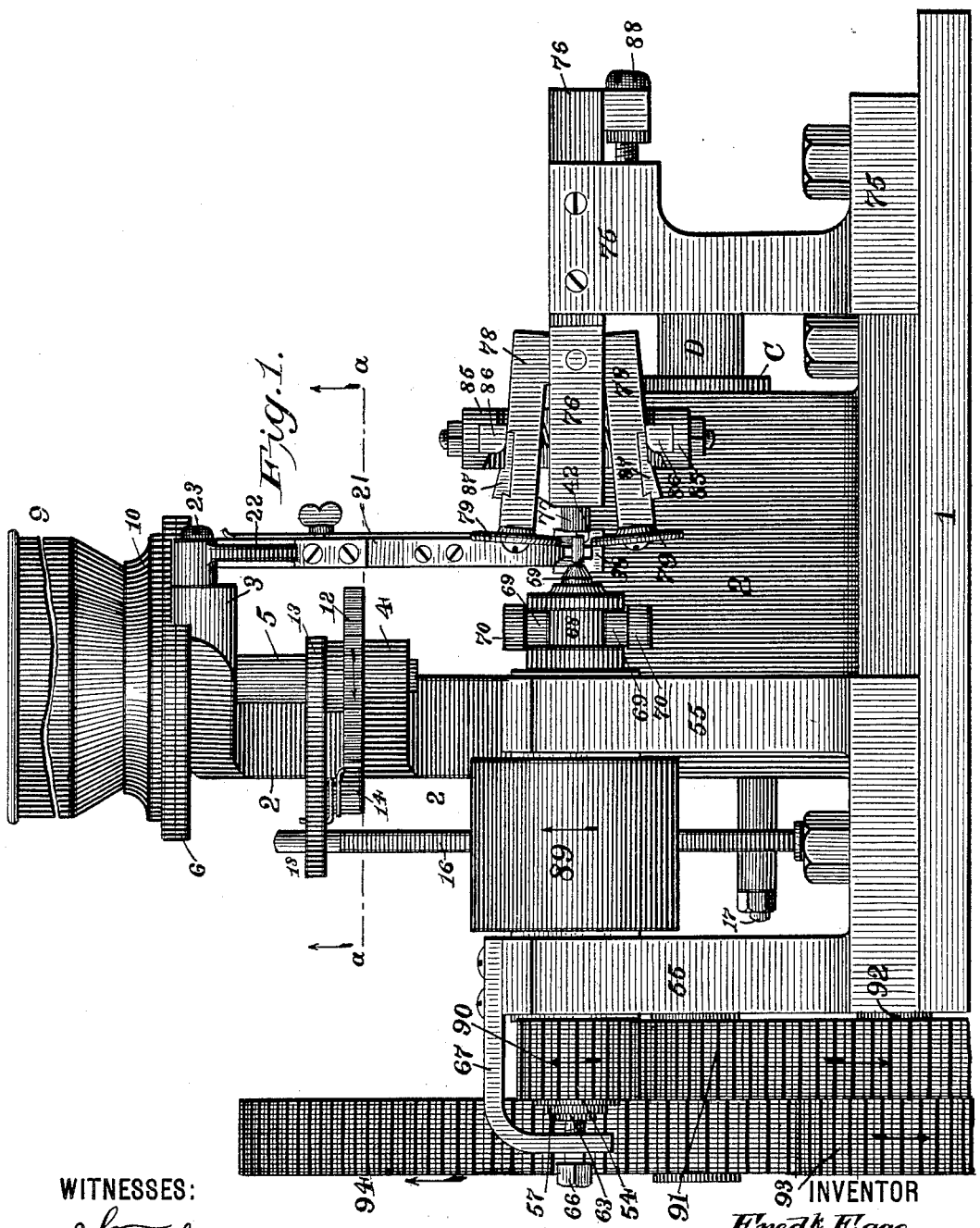
Figure 2:
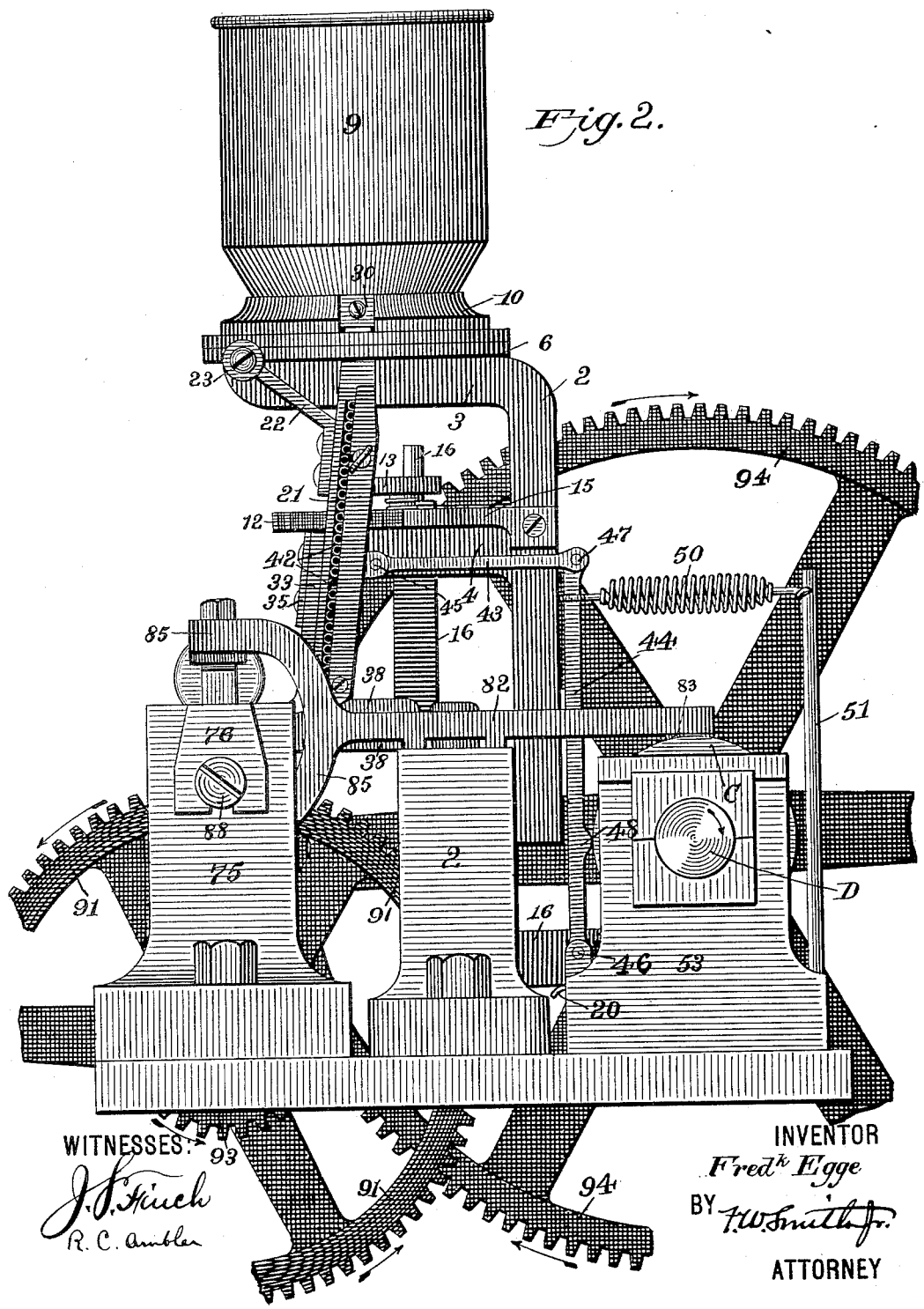
Figure 3:
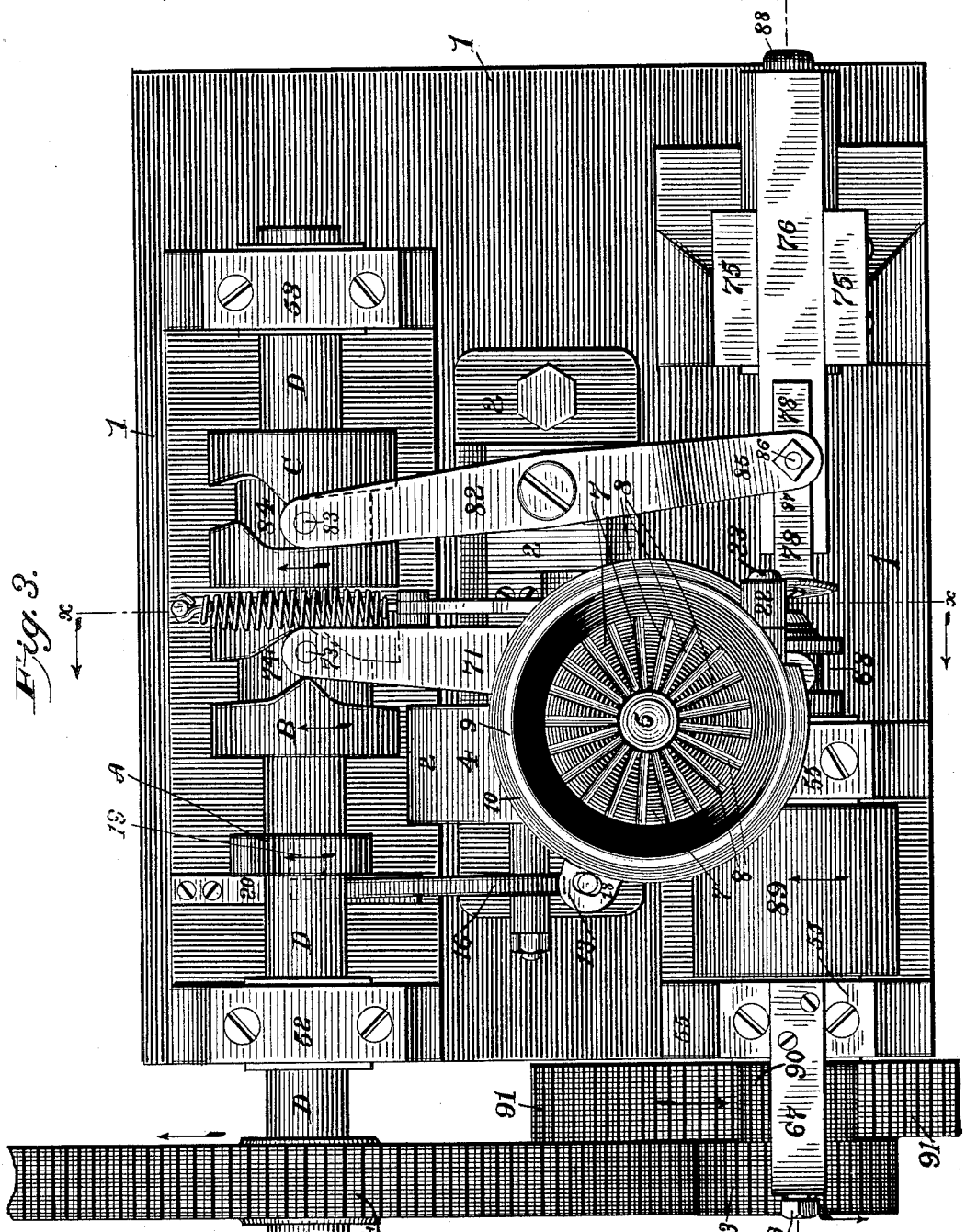
Figure 4:
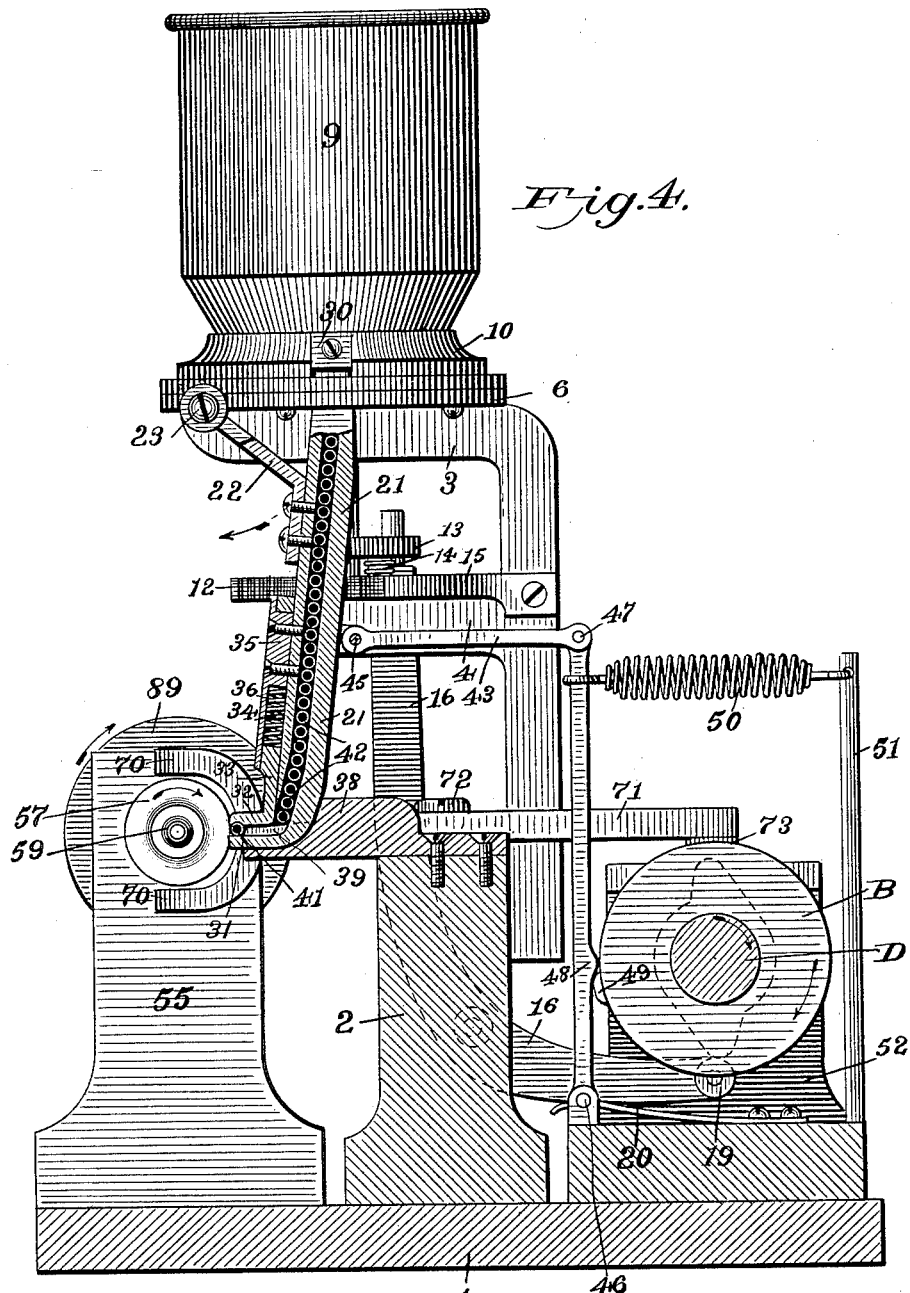
Figure 5:
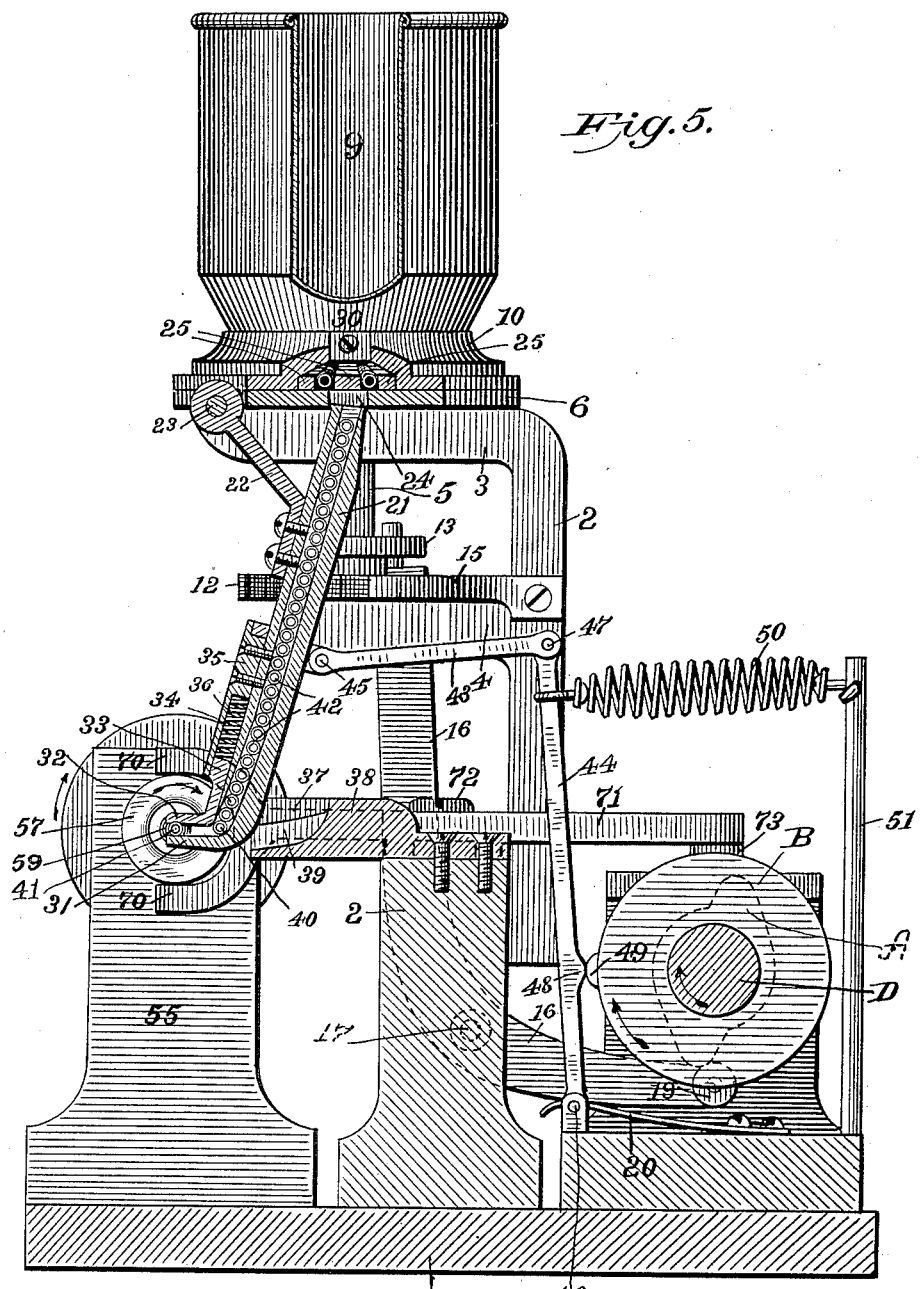
Figure 6:
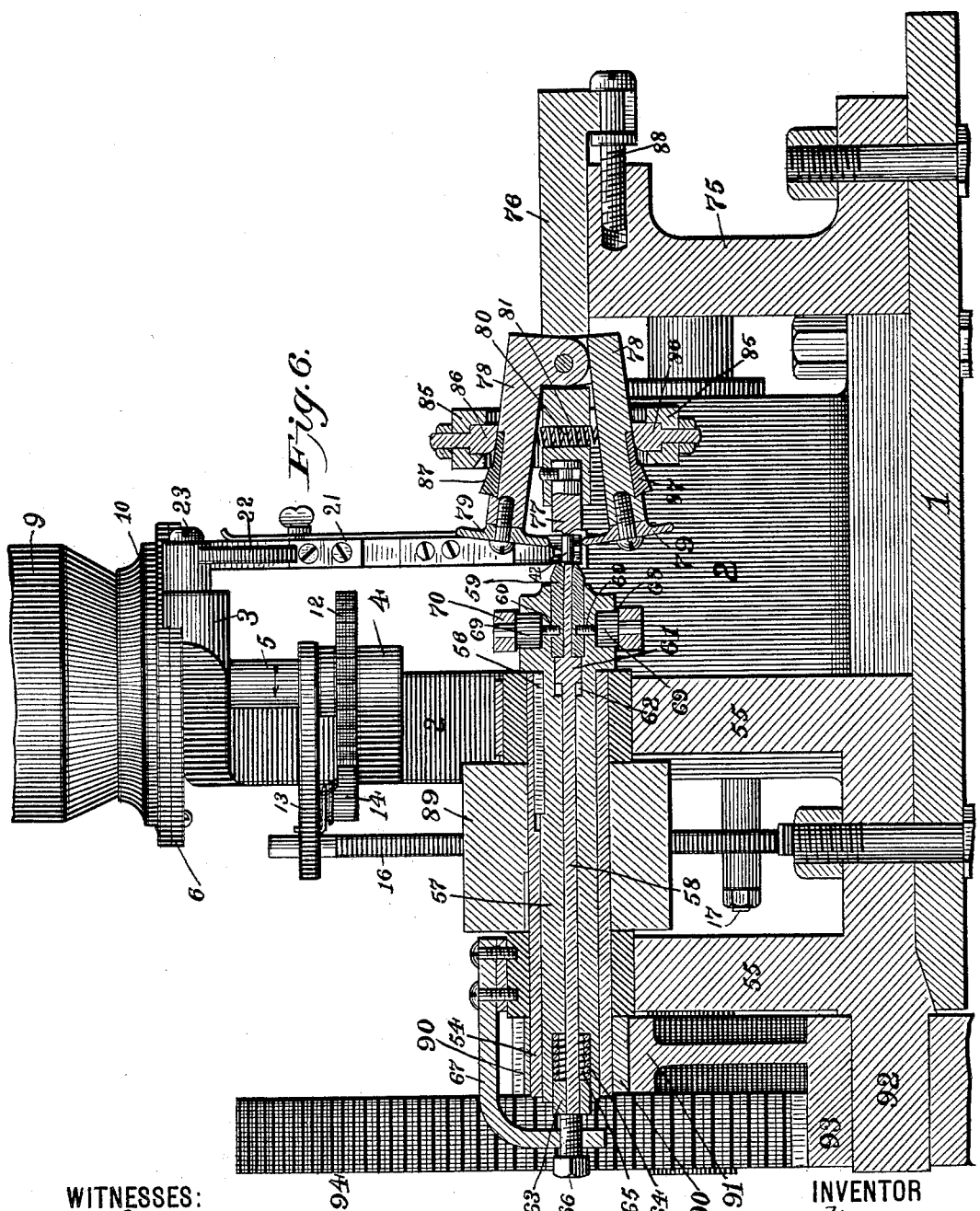
Figure 7:
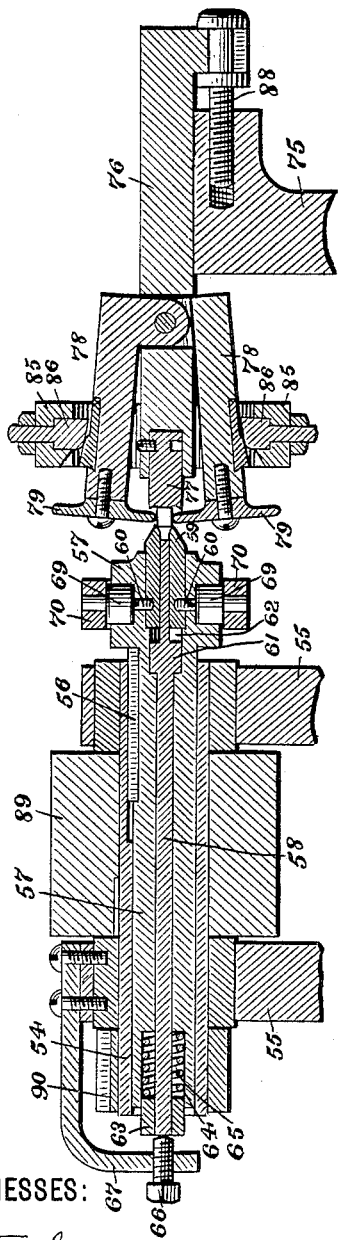
Figure 8:
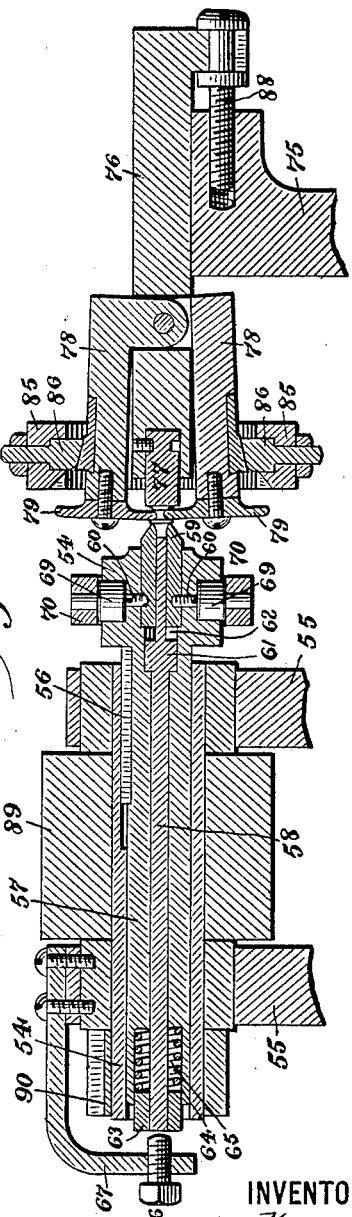

In the accompanying drawings, Figure 1 is a front elevation of my machine; Fig. 2, a side elevation; Fig. 3, a plan view; Figs. 4 and 5, sections at the line $x\ x$ of Fig. 3 and showing, respectively, the appearance of the parts when the chute is in its retracted and projected positions; Fig. 6, a section taken at the line $y\ y$ of Fig. 3. Figs. 7 and 8 are detail broken sectional elevations showing particularly the positions of the clamping and spinning mechanisms prior to and immediately after the proper shaping of the tubes; Fig. 9, a detail plan of the platform, the hopper-base, and the feed-disk in proper relative position; Fig. 10, a section at the line $z\ z$ of Fig. 10; Fig. 11, a section at the line $a\ a$ of Fig. 1; Fig. 12, a detail broken perspective showing particularly the relative position of the lower extremity of the chute and the housing which supports the column of tubes; Fig. 13, a detail of the tube; and Figs. 14 and 15 details showing, respectively, the shape of the tube after the operation of the reducing-die and after the operation of the spinning-disks.

Similar letters denote like parts in the several figures of the drawings.

The machine which forms the subject of this application is especially designed for the manufacture of lacing-studs from sheet-metal tubes, the latter being automatically assembled and fed from a hopper within a chute, whence they are successively delivered to the appliances which give the requisite shape to the tube to form the latter into a lacing-stud.

The lacing-stud which I aim to produce has a tubular shank which constitutes the setting-eyelet, a setting-flange, a diminished neck, and an overhanging head. The stud thus formed is covered with a jacket of any suitable material to present a finished appearance; but this covering of the head forms no part of my invention, the latter relating solely to the manufacture of the studs from the tubular sheet-metal blanks.

My invention comprises in its organization three principal mechanisms, as follows: Mechanism for feeding the tubes to the chute; mechanism for delivering the tubes from the chute to the devices for clamping the tube and forming on one end of the latter the shank which constitutes the setting-eyelet, and mechanism for spinning the tube into the required shape. All these mechanisms are combined with each other to effect a unitary result, and, furthermore, they are each timed to perform their functions in the order in which they are above named.

My invention in part or parts may be carried out by mechanisms differing somewhat from those herein shown and described, especially in the details of construction, the gist of my invention resting in the broad idea of the functions of the several mechanisms rather than in the specific constructions of the mechanisms themselves.

Referring to the accompanying drawings, I will first describe the mechanism whereby the tubes are automatically fed to the point at which they are delivered to the mechanism which operates to give the desired shape to the tubes.

1 is the bed-plate of the machine, and 2 a standard rising therefrom.

3 4 are brackets extending laterally from said standard, and 5 is a short shaft journaled within said brackets.

6 is a platform, which surmounts the top of the standard, and 7 is a feed-disk rigidly secured to the upper end of the shaft 5 and resting on said platform. This disk has radial channels 8, which extend through the periphery of the disk, and within which the tubes are automatically assembled lengthwise, as will be hereinafter set forth.

9 is a hopper, whose base 10 is secured directly upon the platform 6. The under side of this base is cut away to form an annular recess 11, within which the disk 7 fits snugly, but is capable of a free rotary movement.

12 is a ratchet-wheel secured on the shaft 5. 13 is a pawl-lever loosely hung around said shaft, and 14 a spring-pawl pivoted to said lever and adapted to engage with the teeth of said wheel when the lever is swung to and fro. 15 is a detent which engages said wheel. The pawl-lever is vibrated back and forth by a bell-crank 16, pivoted around a pin 17, extending laterally from the standard 2. The upper end of this bell-crank is loosely connected at 18 with the lever 13, while the lower end is provided with a friction-roll 19, which is engaged by a suitably-shaped cam A to depress the lower leg of the bell-crank, whereby the lever 13 is swung to cause the pawl 14 to actuate the ratchet and revolve the disk 7. A spring 20, secured at one end to the bed 1 and exerting a pressure with its free end against the under side of the lower leg of the bell-crank, serves to return the latter, and consequently the lever 13 and pawl 14, to normal position.

21 is the chute, which has an arm 22 extending therefrom and pivoted at 23 to the standard 2. The upper end of this chute projects upward within a gate 24 in the platform, over which gate the ends of the channels successively pass as the disk is revolved. I would state that the ends of the channels are open clear through to the platform 6, upon which said disk rests, and that said openings are sufficient in length to accommodate a single tube, so that it will be readily understood that the chute will be supplied with tubes 42 by the dropping of the latter through the gate 24 within said chute during the revolution of the disk 7. During the revolving of the disk the chute remains stationary in its normal position; but when the chute is thrown forward, as will be presently explained, one of the partitions 25 between the channels 8 will have been brought immediately over the gate, thereby closing the same, and the disk will remain stationary until the chute has been returned to normal position, as shown at Fig. 5.

26 are strikers which extend from the inner wall of the base 10 immediately over the disk, the function of these strikers being to knock down tubes that stand on end and to thereby properly assemble them within the channels.

27 is a cast-off block extending laterally from the inner wall of the base 10 and immediately overhanging the disk. The inner edge of this block is tapered from the rear point 28 to the nose 29, and the latter projects beyond the vertical plane of the gate 24, so that the mass of tubes in the hopper cannot crowd down upon the individual tubes as they come into position to drop through the gate and thereby clog the latter and possibly cause them to be jammed. The block simply casts off the tube to one side and acts as a sort of roof to preserve the individuality of the tubes when they are in a position to drop within the chute.

30 is a flat spring secured to the base 10 and extending above the disk in such manner as to bear against the tubes, which immediately succeed those that are in position to fall within the chute. The reason for this will be readily understood when it is seen that a tube dropping into the chute will leave a space in the channel which it had occupied, and that it would not be advisable to allow the tube next in the rear to slide down until the channel containing it had passed beyond the gate. In other words, the action of this spring still further preserves the individuality of the tubes as they drop into the chute.

The lower end of the chute terminates in a horizontal forwardly-extending finger 31, while above the latter is a spring presser-foot 32, between which finger and foot the tubes are grasped prior to their delivery to the clamping devices. The construction of this presser-foot is very ordinary, the shank 33 of said foot merely extending upward within a socket 34 in an adjunct 35 of the chute, while a coil-spring 36 within said socket exerts a downward pressure against said foot. This finger and foot are narrower than the length of the tubes, so that the latter will project at the sides thereof, as shown at Figs. 1 and 12.

37 is a housing formed in an extension 38, which latter is secured to the standard 2. At the forward end of this housing are shoulders 39, (see Figs. 1, 4, 5, 6, and 12,) upon which the projecting ends of the lower tube in the chute rest when the latter is in its retracted or normal position, the narrow finger 31 being accommodated between said shoulders. When the chute is projected the lower tube will drop by gravity to the bottom of the chute and below the upper edges of said shoulders, as shown in the instance of the tube numbered 40 in Figs. 5 and 12, so that it will be readily understood that when the chute is retracted said tube will strike against the ends of said shoulders and thereby be forced between the finger and foot to the extreme ends thereof, as is shown in Fig. 4 in the instance of the tube number 41.

43 44 are levers whose outer ends are pivoted, respectively, at 45 46 to the chute and bed 1, while their inner ends are pivoted to each other at 47.

48 is a short swell on the outer edge of the lever 44, and 49 is a wiper projecting from the cam B, adapted to engage said swell, whereby the chute is projected, as shown at Fig. 5.

50 is a coil-spring, one end of which is secured to a pin 51 projecting from the bed, the other end being fastened to the lever 44, the function of this spring being to return said lever to normal position to retract the chute after the projection 49 has passed beyond the swell 48.

Right here I will say that both the forward and backward movements of the lever 44 can obviously be effected positively in several well-known ways, and I do not therefore wish to be limited to the construction shown for accomplishing these movements.

Having heretofore described in detail the mechanism whereby the tubes are assembled within a hopper, deposited in a chute, and therein properly arranged preparatory to their delivery to the devices for clamping and forming into the desired shape, I will now describe the mechanism whereby the tubes are successively clamped as they are delivered from the chute, and are then operated upon to form the tubular shank which constitutes the setting eyelet.

At the rear of the bed project blocks 52 53, within which is journaled the shaft D. On this shaft are rigidly mounted the cams A B C. The cam A operates the bell-crank 16, as hereinbefore set forth, while the cams B C effect the operation of the clamping and spinning mechanisms respectively, as will be hereinafter specified.

54 is a shaft journaled within uprights 55, supported on the bed 1. This shaft is hollow and has extending therethrough and splined thereto by spline 56 the spindle 57, which latter is capable of a free longitudinal movement within said shaft. The spindle itself is perforated longitudinally and contains the clamping-pin 58, which has a free movement within the spindle. Within the inner end of the spindle the reducing-die 59 is secured by screws 60, and within this die the inner end of the pin 58 projects. A collar 61 is formed on the pin 58 in the rear of the die 59, which collar is accommodated within an enlarged recess 62 in the spindle, the length of said recess being greater than that of the collar, so as to permit of independent movements of the spindle and pin for the purpose presently explained. The mouth of the die 59 is shaped to conform to the shape of the tubular shank of the completed stud. At the rear end of the pin 58 is a head 63, which is accommodated within a recess 64 in the spindle 57. A coil-spring 65 within said recess and having an effective action against the inner wall of said head keeps the pin 58 in a normally-retracted position, while a set-screw 66, driven through the rigid bracket 67, bears against the said head both to act as a stop thereto and to effect the required normal adjustment of the pin 58. The forward extremity of the spindle has a circumferential groove 68, within which extend friction-rollers 69, carried by the yoke-arms 70. These arms branch out from a lever 71, which is pivoted at 72 on the standard 2 and is provided at its rear end with a friction-roll 73, the latter depending within the cam-groove 74 in the cam B. The action of the cam will vibrate the lever 71 to and fro, whereby the spindle 57 will be thrown forward and backward for the purpose presently explained.

75 is a block secured in the bed 1, and on this block and within suitable ways is a sliding carriage 76. In the inner end of this carriage is swiveled the clamping-block 77, whose face is conformed to the shape of the head of the completed stud. Pivoted to said carriage are the arms 78, in the free ends of which are journaled the spinning-disks 79. A coil-spring 80, housed within a perforation 81 in the carriage, bears against the arms 78 to keep them normally distended.

82 is a lever pivoted on the standard 2 and having at its rear end a friction-roll 83, depending within the cam-groove 84 of the cam C. The forward end of this lever 82 has forks 85, which embrace the arms 78, as shown in Figs. 1, 2, 7, and 8. The arms are provided with cam-blocks 86, secured thereto, and the forks 85 carry cams 87, adapted to travel up said blocks when the forks are thrown inward. It will be readily understood, therefore, that the action of the cam C will vibrate the lever 82 to and fro, whereby the spinning-disks 79 will be caused to converge and diverge for the purpose presently explained.

88 is an adjusting-screw driven from the rear of the carriage 76 into the block 75, whereby the position of the disks 79 and the clamping-block 77 with respect to a vertical plane may be regulated.

Mounted tightly on the shaft 54 are the power-pulley 89 and the pinion 90. Meshing with this pinion is a gear 91, loosely mounted on the short shaft 92, which extends laterally from the base of the uprights 55.

93 is a pinion integral with the hub of the gear 91, but extended therefrom and meshing with the large gear 94, which is tightly mounted on the end of the shaft D. It will therefore be seen that power is communicated from the shaft 54 to the shaft D through the gears 90, 91, 93, and 94, and these gears are simply for the purpose of regulating the speed of the shaft D, so that the several cams mounted thereon may perform their functions under the most favorable conditions.

The operation of my improvement is as follows: The tubes are assembled within the feed-disk and are fed into the chute in the manner hereinbefore set forth, the lower tube being grasped between the finger 31 and spring-foot 32, as shown in Fig. 4. The action of the wiper 49 will throw the chute forward, as shown at Fig. 5, so that the tube 41 will extend between the reducing-die 59 and the clamping-block 77, as shown at Figs. 1 and 6. The lever 71 is now acted upon by the cam B to throw the die 59 forward against the tube 42, and said die will by its action both clamp the tube against the block 77 and also reduce the latter into the shape shown at Figs. 7 and 14. The lever 82 is now operated by its cam C to bring the spinning-disks 79 into efficient action, as shown in Figs. 7 and 8. As these disks spin the tube into the shape shown at Figs. 8 and 15, the length of the tube will become lessened; but synchronously with the spinning operation of the disks the cam B continues to act on the lever 71 to force the spindle 57 forward, whereby the rear wall of the recess 62 will strike the collar 61 and thereby drive the pin 58 firmly against the tube to clamp the latter against the block 77. The timing of the cams B and C is such that the pin 58 is advanced exactly as fast as the tube is shortened, and therefore said tube will be constantly clamped during the spinning. After the tube has been shaped into the form of the stud shown at Figs. 8 and 15 the action of the cams B C will throw back the levers 71 82, thereby allowing the disks 79 to distend and retracting the spindle 57 and die 59, as shown in Figs. 1 and 6. The finished stud then drops into any suitable receptacle and the succeeding tube is brought into position and shaped as above set forth, and so on. The spring 65 acts to keep the pin retracted, so that when the die 59 is advanced to form the setting-eyelet on the tube said pin will not thereby be carried by friction inside of the tube and interfere with the action of said die.

I desire to call especial attention to the fact that there is an odd number of channels 8 in the feed-disk 7, and that the action of the pawl 14 and ratchet-wheel 12 is such that the intermittent rotation of said disk will bring said channels in alternate series to a point of rest opposite to the gate 24. In other words, if we number the channels 1 2 3 4 5 6 7 8, &c., the first complete revolution of the disk will cause the chute to be supplied from one series of channels, say, 1 3 5 7, &c., while the second revolution will bring the series 2 4 6 8, &c., into position to supply said chute. The chute is supposed to be always full of tubes when the channels which alternate in the above series pass over the gate 24.

The object of this construction is to still further insure the proper assembling of the tubes within the channels, for if one or more tubes in a series have not been properly arranged by the strikers 26 and cast-off 27, there will be two revolutions of the disk instead of one, throughout which said tubes may be so assembled in their channels that at the proper time the latter will deliver the tubes to the chute. In other words, the opportunities for the proper arrangement of the tubes are doubled.

Having thus described my invention, what I claim as new, and desire to secure by Letters Patent, is—

1. In a machine for forming lacing-studs from tubular blanks, the combination of a hopper and feed-disk, within which the tubes are properly assembled, a swinging chute into which the tubes are deposited from said disk, and mechanism for reducing and spinning said tubes into the shape of studs, substantially as set forth.

2. In a machine for forming lacing-studs from tubular blanks, the combination of means for feeding and delivering the tubes to the spinning mechanism, means for reducing the tubular setting-eyelet, and means for forming a diminished neck and overhanging head, substantially as set forth.

3. In a machine for forming lacing-studs from tubular blanks, the combination of the hopper, the feeding-disk having radial feed-channels, means for intermittingly revolving said disk, and the chute into which said channels lead, substantially as set forth.

4. The herein-described improvement in mechanism for manufacturing lacing-studs from tubular blanks, which consists of the combination of the following instrumentalities, namely: an intermittingly rotating feed-disk having radial channels within which the tubes are assembled, a pivoted chute into which said tubes are deposited, clamping, reducing, and spinning mechanism by which the tubes are held and properly shaped, and means for projecting said chute and presenting a tube to the action of said mechanism, substantially as shown and described.

5. The combination of the hopper 9, having base 10, the platform 6, the feed-disk 7, having radial channels 8, the pivoted chute 21, into which said channels lead, the shaft 5, to which said disk is secured, and means for intermittingly rotating said shaft, substantially as set forth.

6. The combination, with the chute, of the feed-disk having radial channels adapted to register with the mouth of said chute, and means for intermittingly revolving said disk, substantially as set forth.

7. The combination, with the feed-disk having radial channels, of the hopper, the cast-off block secured to the base of said hopper and extending over said channels, and means for revolving said disk, substantially as set forth.

8. The combination of the rotary feed-disk having radial channels, the hopper, the chute into which the channels lead during the revolution of said disk, and the cast-off block extending from the base of the hopper over said channels and at a point opposite the mouth of the chute, substantially as shown and described.

9. The combination, with the hopper and the rotary feed-disk having radial channels, of the strikers extending from the base of the hopper inwardly over said channels, substantially as set forth.

10. The combination of the feed-disk 7, the shaft 5, the ratchet-wheel 12, the lever 13, loosely pivoted around said shaft, the spring-pawl 14, carried by said lever, the pivoted bell-crank 16, whose upper extremity engages said lever, and the rotary cam A, which engages the lower end of said bell-crank, substantially as set forth.

11. The combination of the rotary feed-disk having radial channels within which the tubes are assembled, the chute into which said channels successively lead, and the stationary spring which operates against the tubes preceding those in the outer ends of said channels, substantially as shown and described.

12. The combination of the pivoted chute having at its lower end a narrow finger 31, and a spring-foot 32 above said finger, with the housing 37, having shoulders 39, substantially as set forth.

13. The combination of the pivoted chute within which the tubes are deposited, having at the lower end a forwardly-extending finger and an overhanging resilient presser-foot, with the housing adapted to contain said finger and foot, and having shoulders upon which the column of tubes in the chute is supported in normal position, and means for swinging said chute forward and backward, whereby said tubes will successively drop beyond said shoulders and thereby be forced between the extreme ends of said finger and foot, substantially as shown and described.

14. In a machine organized for the purpose of manufacturing lacing-studs from tubular blanks, the combination of instrumentalities for feeding the tubes, instrumentalities for reducing the setting-eyelet on the end of the tube, and instrumentalities for subsequently spinning the diminished neck and overhanging head of the stud, substantially as and for the purpose hereinbefore shown and described.

15. The combination of the clamping-block 77 and the rotatory and longitudinally-movable reducing-die 59, substantially as set forth.

16. The combination of the clamping-block 77, the rotatory and longitudinally-movable reducing-die 59, the spring-retracted clamping-pin 58, having a free movement within said die, the spinning-disks 79, and means for throwing said disks into operation, substantially as set forth.

17. The combination of the hollow power-shaft 54, the spindle 57, splined within the same, but having a longitudinal movement therein and provided with recesses 62 and 64, the reducing-die 59, secured in the inner end of said spindle, the clamping-pin 58 within said spindle and die and having a collar 61, which has a free movement in the recess 62, the head 63 on the rear end of the pin, the spring 65 within the recess 64 and bearing against said head to retract the pin, the adjustable stop 66, against which said head abuts, means for reciprocating said spindle forward and backward, the clamping-block 77, the spinning-disks 79, means for converging and diverging said disks, and mechanism for feeding and presenting the tubes to the action of the clamping, reducing, and spinning devices, substantially as set forth.

18. The combination of the spring-retracted clamping-pin 58 with the longitudinally-movable spindle 57 and the die 59 carried thereby, said spindle adapted to force said pin forward at a predetermined time, substantially as set forth.

19. In a machine for manufacturing lacing-studs from tubular blanks, the combination, with the spinning mechanisms, of the clamping mechanism, and means for automatically operating the latter to constantly clamp the blanks during the spinning, substantially as and for the purposes hereinbefore set forth.

20. In a machine for manufacturing lacing-studs from tubular blanks, the combination of the mechanisms for feeding, clamping, reducing, and spinning the blanks, with a series of cams mounted on a common shaft, and a series of pivoted levers having connection at their front and rear ends with said mechanisms and cams, respectively, substantially as set forth.

21. The combination of the pivoted chute 21, the levers 44 43, pivoted to each other and to the bed 1 and said chute, respectively, the swell 48 on the lever 44, the wiper 49, extending from the rotary cam B and adapted to operate against said swell, and the spring 50, adapted to return the lever 44 to normal position, substantially as and for the purposes set forth.

22. The combination of the spindle 57, having groove 68, the pivoted lever 71, having at its forward end yoke-arms 70, provided with friction-rolls which extend within said groove, the friction-roll 73, depending from the rear end of said lever, and the rotary cam B, having groove 74, which embraces said roll 73, substantially as set forth.

23. The combination of the lever 13, the pivoted bell-crank 16, whose upper leg is connected with said lever and whose lower leg is provided with a friction-roll 19, the rotary cam A, which acts against said roll to operate said lever, and the spring 20, which bears against said lower leg to return the lever to normal position, substantially as set forth.

24. The combination of the pivoted arms 78, the coil-spring 80 between said arms to keep them apart, the spinning-disks 79, journaled in the ends of said arms, the cam-surfaces 87 on said arms, the pivoted lever 82, having forks 85 at its forward end, cam-blocks 86, carried by said forks and adapted to operate against the surfaces 87, friction-roll 83, depending from the rear end of said lever, and the rotary cam C, having groove 84, which embraces said roll, substantially as set forth.

In testimony whereof I affix my signature in presence of two witnesses.

FREDERICK EGGE.

Witnesses:
F. W. SMITH, Jr.,
J. S. FINCH.